(12) United States Patent
Burago

(10) Patent No.: US 9,001,126 B2
(45) Date of Patent: Apr. 7, 2015

(54) DISPLAYING TEXT ON PATH

(75) Inventor: Andrei Burago, Kirkland, WA (US)

(73) Assignee: Adobe Systems Incorporated, San Jose, AZ (US)

( * ) Notice: Subject to any disclaimer, the term of this patent is extended or adjusted under 35 U.S.C. 154(b) by 927 days.

(21) Appl. No.: 12/130,938

(22) Filed: May 30, 2008

(65) Prior Publication Data

US 2014/0035926 A1   Feb. 6, 2014

(51) Int. Cl.
*G09G 5/00*   (2006.01)
*G06T 11/20*   (2006.01)

(52) U.S. Cl.
CPC .................... *G06T 11/203* (2013.01)

(58) Field of Classification Search
USPC ........ 345/441, 442, 443, 467, 468, 49, 469.2, 345/470, 619
See application file for complete search history.

(56) References Cited

U.S. PATENT DOCUMENTS

| | | | |
|---|---|---|---|
| 5,444,825 A * | 8/1995 | Bain et al. ................. | 345/443 |
| 5,724,072 A * | 3/1998 | Freeman et al. ............ | 345/648 |
| 6,310,622 B1 * | 10/2001 | Asente ...................... | 345/441 |
| 6,803,913 B1 * | 10/2004 | Fushiki et al. ............. | 345/467 |
| 7,712,018 B2 * | 5/2010 | Brown et al. ............... | 715/204 |
| 2005/0007369 A1 * | 1/2005 | Cao et al. .................. | 345/442 |
| 2008/0238927 A1 * | 10/2008 | Mansfield ................... | 345/467 |

OTHER PUBLICATIONS

Adobe Systems Incorporated, "Adobe Illustrator 10, Chapter 12: Using Type", 2001, pp. 267-272.
Adobe Systems Incorporated, Adobe Illustrator 10, Classroom in a Book, Lesson 7: Working with Type, Adobe Press, 2002, pp. 216-237.
Adobe Systems Incorporated, Adobe Illustrator CS2 Tutorial "Put type on a path," www.studio.adobe.com, 2006, pp. 1-3.
Adobe Systems Incorporated, "Adobe Illustrator CS3 Classroom in a Book, Lesson 7: Working with Type", Adobe Press, 2007, pp. 218-220.
Golding, "Real World Adobe Illustrator CS3, Chapter 7: Typography, Putting Type on a Path", Peachpit Press, 2008, pp. 249-253.
Kvern, et al. "Real World Adobe InDesign CS3, Chapter 6: Where Text Meets Graphics", Peachpit Press, 2008, pp. 476-483.
McClelland, Adobe Systems Incorporated, Real World Adobe Illustrator 10, Chapter 11: Some Of Your Wackier Text Effects, Peachpit Press, 2002, pp. 361-376.

* cited by examiner

*Primary Examiner* — Jeffrey Chow
(74) *Attorney, Agent, or Firm* — Shook, Hardy & Bacon L.L.P.

(57) ABSTRACT

A method of displaying text on a path includes creating a mapping between distances along the path and points on a line based on changes in direction of the path, composing glyphs on the line, having a total line length defined in accordance with the mapping, to form a composed line, associating the glyphs with the path in accordance with the mapping and the composed line, and outputting the association of the glyphs with the path for display of the glyphs along the path.

21 Claims, 10 Drawing Sheets

Text on a path

Text on a path

DISPLAYING TEXT ON PATH

BACKGROUND

The present disclosure relates to displaying text on path.

Text and graphic editing software tools can be used to generate, among other things, documents, artwork, technical illustrations, graphics, and page designs. In some cases, it is desirable to use the text or graphical editing tools to display text characters, also known as glyphs, such that they follow the contour and outline of a path (e.g., a portion of a shape's perimeter). Once placed on the path, the graphical editing tools can be used to transform the glyphs including, for example, twisting, skewing or changing the alignment of text. The variation of the path on which the glyphs are placed can affect how the characters are displayed.

SUMMARY

This specification describes technologies relating to displaying text on a path. In general, one aspect of the subject matter described in this specification can be embodied in a computer-implemented method that includes creating a mapping between distances along a path and points on a line based on changes in direction of the path, composing glyphs on the line, having a total line length defined in accordance with the mapping, to form a composed line, associating the glyphs with the path in accordance with the mapping and the composed line, and outputting the association of the glyphs with the path for display of the glyphs along the path. Other embodiments of this aspect include corresponding systems, apparatus, and computer program products.

These and other embodiments can optionally include one or more of the following features. Composing the glyphs on the line can include passing the total line length and the glyphs to a separate line composer. Creating the mapping can include segmenting the path, to acquire the distances, based on a font size associated with the glyphs, calculating an advance value for each of the acquired distances along the path based on a change in angle of the path with respect to a current segment, and calculating the points on the line and the total line length based on the advance values.

Associating the glyphs with the path can include translating each glyph, from a position on the line, to a position on the path in accordance with the mapping, aligning each glyph to the path, and rotating each glyph based on an average of values in which each value indicates a measure of slope of the path at a corresponding location on the path. The locations on the path can be selected in accordance with a specified smoothing radius. The specified smoothing radius can be calculated in accordance with the font size associated with the glyphs and/or placed under user control.

Creating the mapping can further include calculating a curvature variation factor with respect to the current segment of the segmented path and scaling the advance value associated with the current segment based on the curvature variation factor. Calculating the curvature variation factor can include: calculating a first distance between two points on the path, in which the two points fall before and after the current segment, respectively, and the first distance corresponds to a straight line between the two points; calculating a second distance between the two points on the path, in which the second distance corresponds to the path between the two points; and calculating the curvature variation factor as a ratio of the first distance to the second distance. A plurality of path segments can be located between the two points on the path.

Particular embodiments of the subject matter described in this specification can be implemented to realize one or more of the following advantages. Spacing between text on a path can be increased or decreased based on the change in direction of the path so that glyphs do not overlap and are not spaced too far apart. Rotating the glyphs based on an average of values that each indicate a path slope can reduce unwanted variations in the glyph orientation. In addition, applying a curvature variation factor to the mapping can improve the spacing between glyphs on paths with bumps that are small relative to the font size.

The details of one or more embodiments of the invention are set forth in the accompanying drawings and the description below. Other features, aspects, and advantages of the invention will become apparent from the description, the drawings, and the claims.

DETAILED DESCRIPTION

Figure 10A:
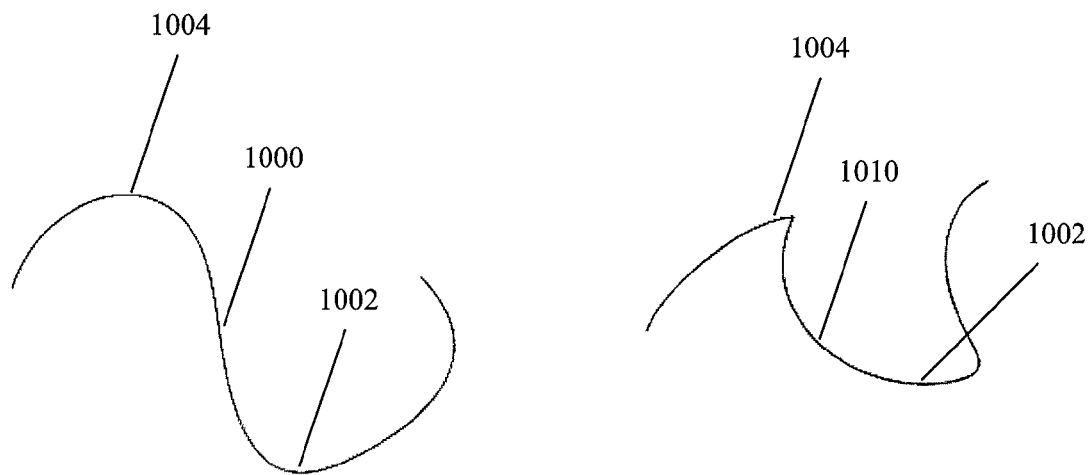
FIGS. 10A and 10B are examples of text on a path.
Figure 10B:
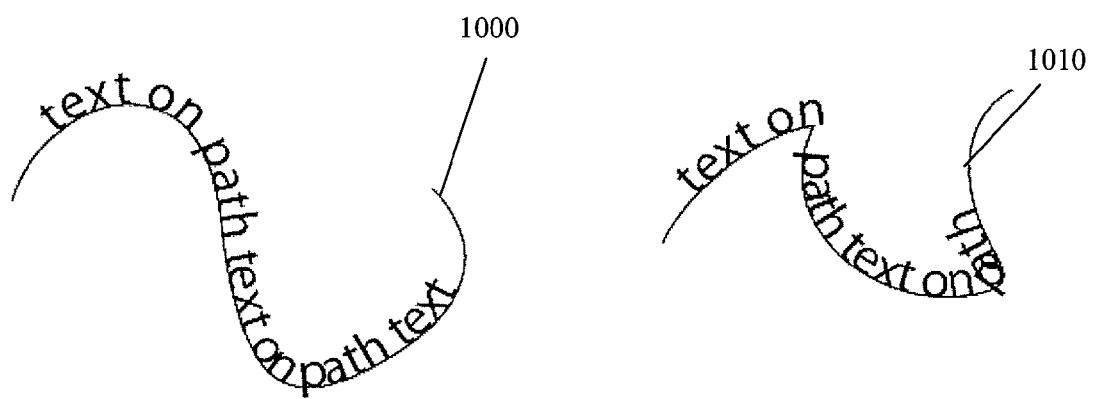

When displaying text on a path, the variation of the path can affect how the characters are displayed. For example, FIG. 10A shows two paths 1000, 1010 each of which include concave portions 1002 and convex portions 1004 on which glyphs 1006 are to be placed. FIG. 10B shows an example of glyphs composed on the lines in FIG. 10A. The spacing between glyphs composed on the concave portions 1002 of the paths 1000, 1010 can be too narrow, whereas the spacing between glyphs on the convex portions 1004 can be too wide. On rugged paths, the glyphs can be rotated at random angles due to bumps and changes in the path directions making the text difficult to read.

Figure 1:
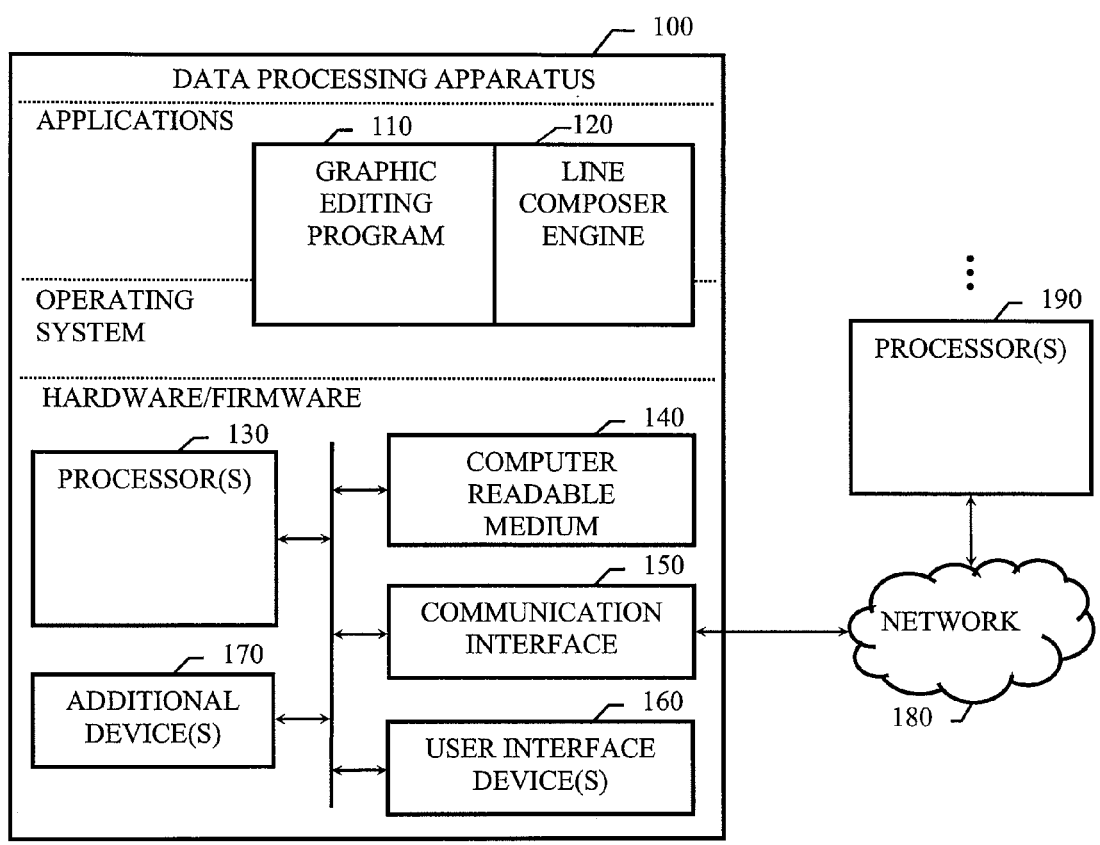
FIG. 1 is an example of a system programmed to allow a user to compose and display text on a path.

FIG. 1 shows an example of a system programmed to allow a user to compose and display text on a path. A data processing apparatus 100 can include hardware/firmware, an operating system and one or more programs, including a graphic editing program 110. The graphic editing program 110 operates, in conjunction with the system 100, to effect various operations described in this specification. Thus, the program 110, in combination with processor(s) and computer-readable media (e.g., memory), represents one or more structural components in the system.

The graphic editing program 110 can be a text editor application, an image processing application, or a portion thereof. As used herein, an application refers to a computer program that the user perceives as a distinct computer tool used for a defined purpose. An application can be built entirely into the operating system (OS) of the data processing apparatus 100, or an application can have different components located in different locations (e.g., one portion in the OS or kernel mode, one portion in the user mode, and one portion in a remote server), and an application can be built on a runtime library serving as a software platform of the data processing apparatus 100. Moreover, an application can be a graphical user interface application (e.g., a Web browser) that connects to one or more processors 190 (e.g., one or more Web servers) over a network 180 and provides the computer tool as a network service. The graphic editing program 110 can include image editing software, digital publishing software, video editing software, presentation and learning software, and graphical/text editing software (e.g., Adobe® Photoshop® software, Adobe® InDesign® software, Adobe® Captivate® software, Adobe® AfterEffects® software and Adobe® Illustrator® software, available from Adobe Systems Incorporated of San Jose, Calif.

The data processing apparatus 100 includes one or more processors 130 and at least one computer-readable medium 140 (e.g., random access memory, storage device, etc.). The data processing apparatus 100 also can include a communication interface 150, one or more user interface devices 160 and one or more additional devices 170. The user interface devices 160 can include keyboard(s), mouse, stylus, microphone or any combination thereof. The user interface device(s) 160 also can include a display monitor, or other raster output device capable of producing color or gray scale pixels on paper, film, display screen, or other output medium. The additional devices 170 include, but are not limited to, printers such as an inkjet and laser printers.

The graphic editing program 110 can be operated by a user of the data processing apparatus 100 to create a path on which text will be placed and to display the path and corresponding text using the user interface device 160. The path can be a line of any curvature or length and can correspond to the outline of a shape or object that is generated and displayed by the graphic editing program 110. The path style, color, and visibility depend on the path properties available within the graphic editing program legend as selected by the user. The graphic editing program 110 also can include a line composer engine 120 for composing text on a line. The line composer engine 120 can be a traditional line composer, such as used with word processing software and need not be part of the program 110.

Figure 2:
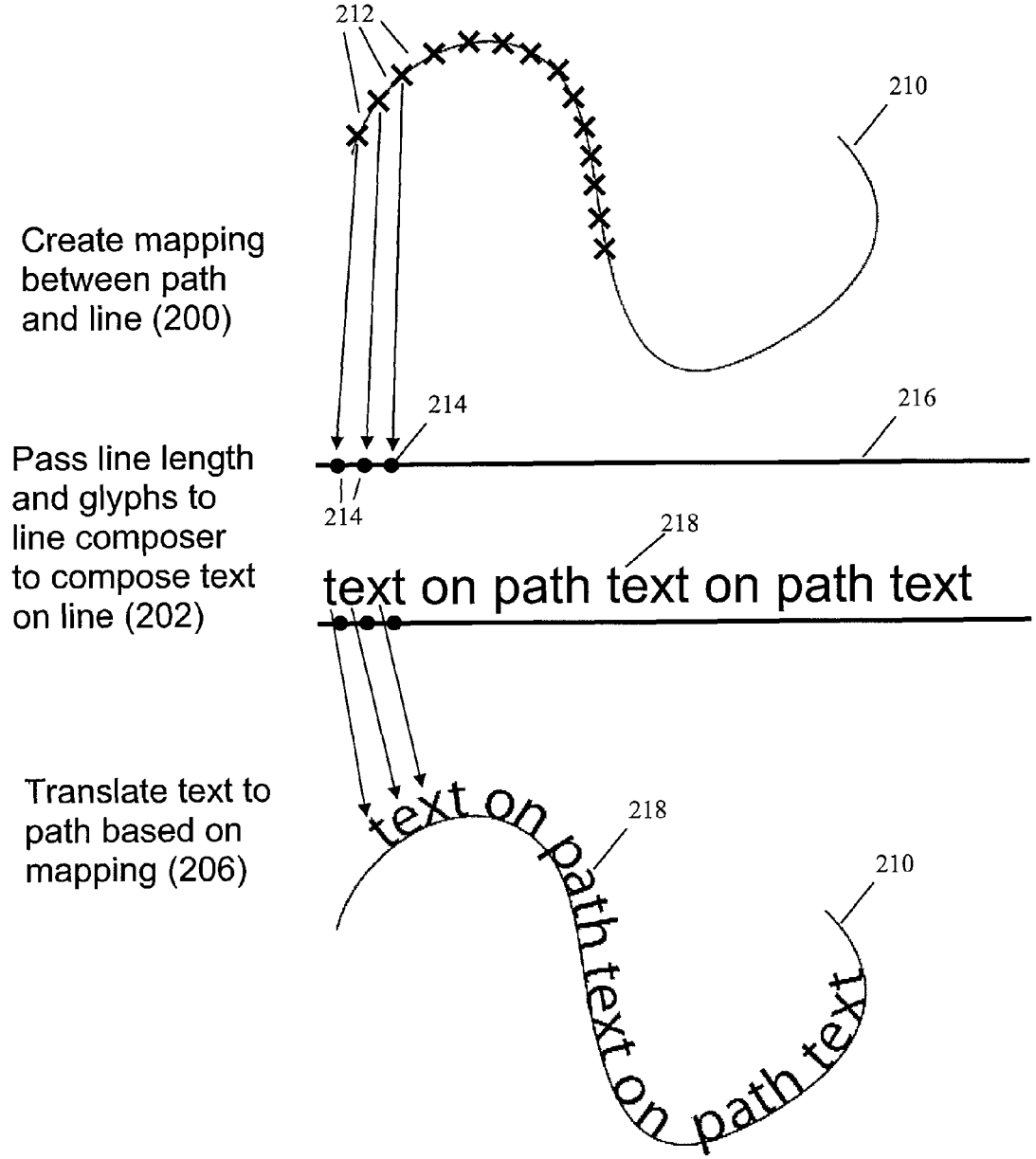
FIG. 2 is an example of the process of applying text on a path.

FIG. 2 shows an example of the process applied by the graphic editing program 110 to display text on a path. Employing the user interface device(s) 160, a user can select a path 210 that has been generated and/or displayed by the graphic editing program 110. Upon selection of the path 210, the graphic editing program 110 can divide the path 210 into a dense set of segments 212, each having a fixed distance. Based on a change in direction of the path segments 212, the graphic editing program 110 then can create a mapping (200) that relates the distances of each segment along the path 210 to respective points 214 on a line 216.

In particular, the mapping serves to provide a guide for spacing glyphs along the path such that when the text is subsequently provided, the glyphs are not located too fart apart or too close together. For example, the mapping can provide a guide for increasing the spacing between glyphs on concave portions of the path 210 while decreasing the spacing between glyphs on convex portions of the path 210.

Once the mapping is generated, the graphic editing program 110 can pass the text and the total length of the line 216 to the line composer engine 120 to compose (202) the text on straight line 216. The line 216 is a non-curved representation of the path 210, in which a total length of the line 216 is determined in accordance with the mapping.

The line composer can associate each glyph 218 of the entered text with a coordinate of a particular point 214 on the line 216. After the text is entered, the graphic editing program 110 then can translate (206) the glyphs from positions on the line to positions on the path 210 according to the mapping. Once the glyphs 218 have been translated to the path 210, the graphic editing program 110 can apply further transformations to each glyph including, but not limited to, rotating the orientation of a glyph on the path 210, changing the vertical alignment of a glyph with respect to the path 210, or applying a graphical effect to the glyphs 218, such as skewing or flipping the glyph with respect to the path 210.

Figure 3:
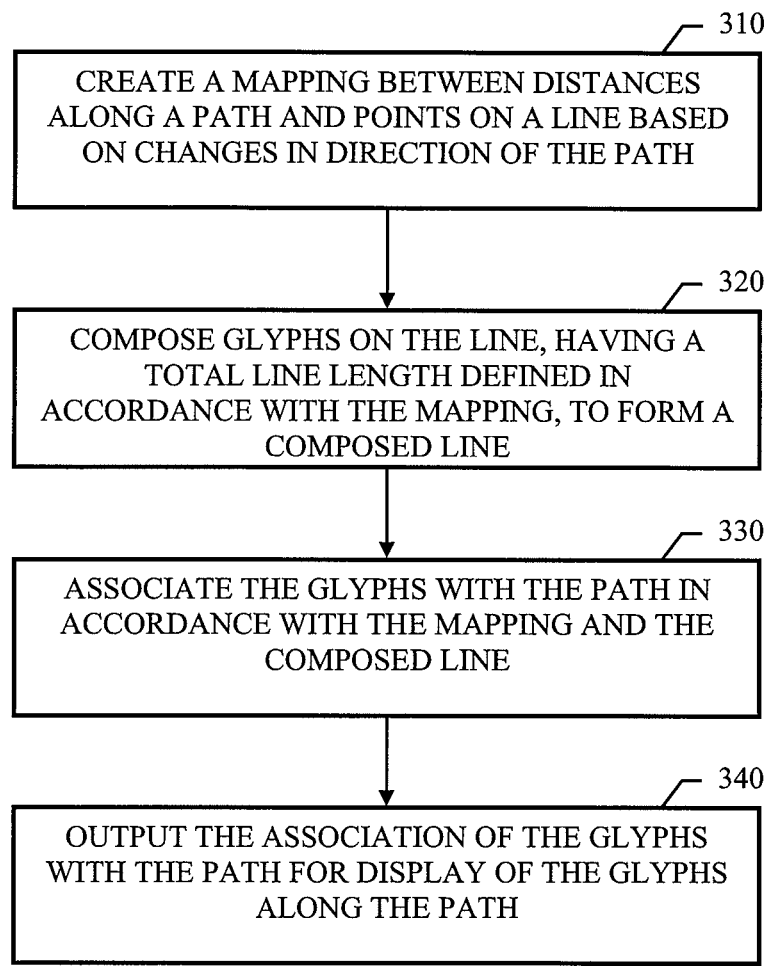
FIG. 3 is a flow chart providing an overview of the process of applying text on a path.

FIG. 3 is a flow chart providing an overview of the example shown in FIG. 2. A mapping is created (310) between distances along a path and points on a separate line based on changes in direction of the path. Creating the mapping can involve dividing the path into a dense set of equidistant points and interpolating the region between the points on the path such that the path is represented as interconnected segments. The length of each segment can be based on a font size associated with the glyphs. For example, in some cases, the length of each segment can be equal to one fifth of the font size or less. If there is more than a single font size associated with the glyphs, the graphic editing program 110 can select a predominant, or average glyph size from the text. Alternatively, or in addition, a user can enter a predominant font size to be used as a base for calculating the segment length.

Creating the mapping can further include calculating an advance value for each segment of the path based on a change in angle of the path with respect to a particular segment. The advance value can be used to determine how much the spacing between glyphs should be increased or decreased so that the glyphs are displayed properly along the path.

Figure 4A:
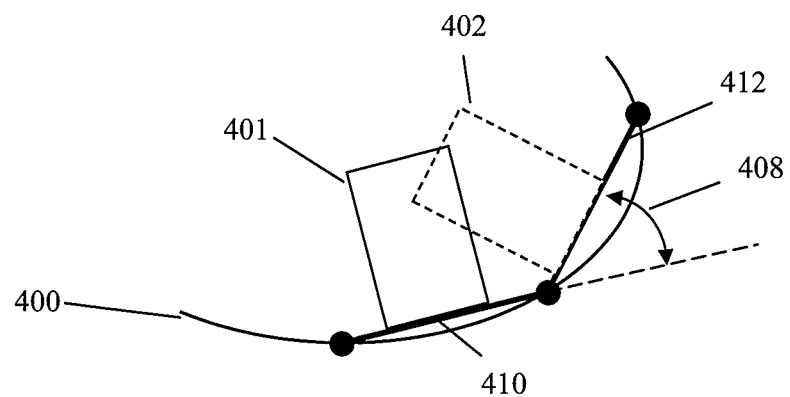
FIGS. 4A and 4B are examples of glyphs on a concave portion of a path.
Figure 4B:
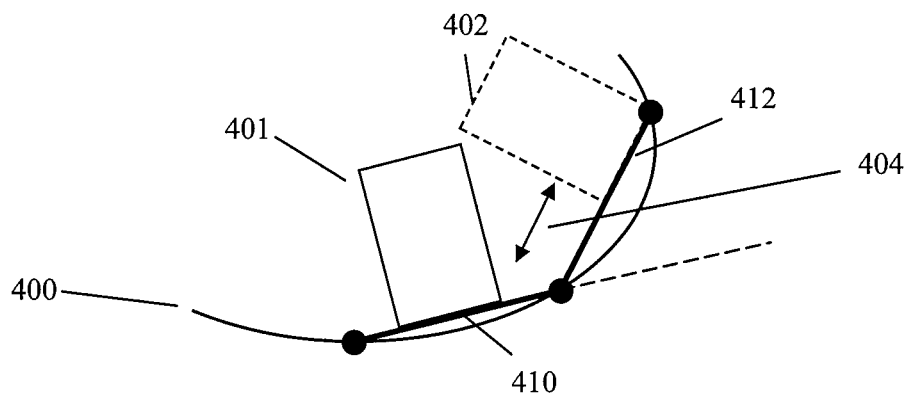

For example, when a first glyph 401 and second glyph 402 are placed on a concave portion of a path 400, as shown in FIG. 4A, the glyphs 401, 402 may overlap one another. To avoid overlapping, the spacing between the glyphs can be increased by a concave adjustment factor 404. The concave adjustment factor 404 is the increase in spacing, as shown in FIG. 4B, and can be made proportional to the product of the glyph font size and a sine of the angle 408, in which angle 408 represents a change in the direction of the current segment 412 from the previous segment 410. The angle 408 can be calculated by taking the difference between the tangents of each segment.

Accordingly, the advance value can be calculated as the length of the current segment 412 less the concave adjustment factor 404. Conversely, when the mapping is used to translate glyphs from a position on the composed straight line to points on the path, the spacing between the points on the path can be increased by the concave adjustment factor 404 so that the glyphs appear further apart.

Figure 5A:
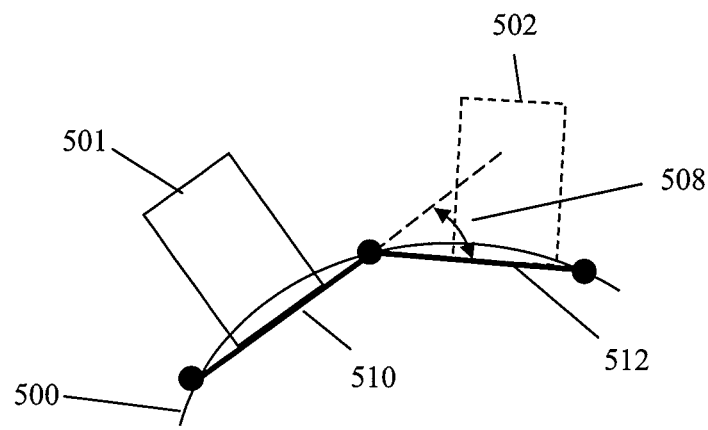
FIGS. 5A and 5B are examples of glyphs on a convex portion of a path.
Figure 5B:
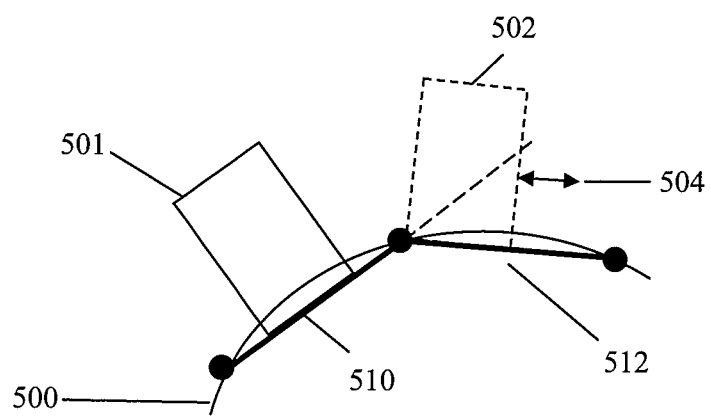

Similarly, when a first glyph 501 and a second glyph 502 are placed on a convex portion of a path 500, as shown in FIG. 5A, the glyphs 501, 502 may appear to be spaced too far apart. Accordingly, the spacing between glyphs on a convex surface can be reduced. In some cases, the convex adjustment factor 504, as shown in FIG. 5B, can be proportional to the font size of the glyph and the sine of an angle 508, in which angle 508 represents a change in direction of a current segment 512 from a previous segment 510. The font size used to calculate the convex adjustment factor can be set by the user. In some cases, the user also can set a proportionality coefficient to scale the convex adjustment factor. Alternatively, the proportionality coefficient can be preset in the graphic editing program 110.

The advance value then can be calculated as the length of the current segment 512 plus the length represented by the decrease in spacing 504. As a result, when the mapping is used to translate a glyph from a position on the composed straight line to a position on the path, the spacing between points on the path is reduced so that the glyphs appear closer together. The advance values and tangent values calculated for each segment can be saved or cached in memory as part of the mapping that will be passed to the line composer.

Figure 6:
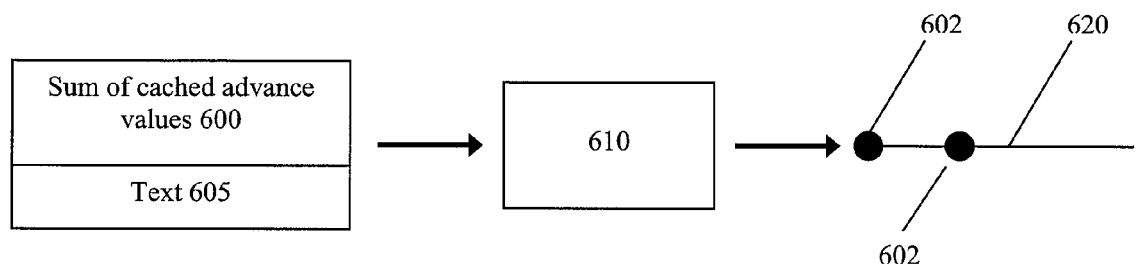
FIG. 6 shows an example of composing glyphs on a line.

Referring again to FIG. 3, the glyphs then can be composed on a line (320), in which the total length of the composed line is defined in accordance with the mapping. As shown in the example of FIG. 6, composing the glyphs on the line can include passing the sum of the cached advance values 600 (i.e., the total line length) from a mapping and the text 605, to a line composer engine 610. The line composer engine can associate each glyph of the text with a corresponding point 602 on the line 620. That is, an origin of each glyph is affiliated with a coordinate of a point 602 along the composed line. A glyph origin can correspond to any position on or near the glyph as identified by the graphic editing program 110. For example, the origin can be located at the glyph top, center, or bottom. Other areas near or on the glyph may correspond to the glyph origin, as well.

Referring back to FIG. 3, the glyphs then are associated (330) with the path in accordance with the mapping and their positions on the composed line. Associating the glyphs with the path can include translating the origin of each glyph, from a position on the composed line, to a position on the path. The previously constructed mapping can be used to calculate the new location of each glyph along the path based on the glyph's position along the composed line. The glyphs associated with the path can then be output (340) to a display or other user interface device.

Figure 7A:
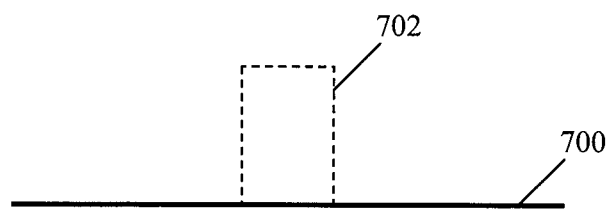
FIGS. 7A and 7B show examples of aligning glyphs to a path.
Figure 7B:
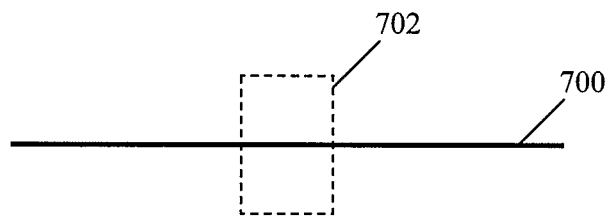

Associating a glyph with the path also can include modifying the alignment of the glyph with respect to the path. Glyph alignment relates to the how the glyph is positioned in a direction orthogonal to the path direction at a particular path segment. FIGS. 7A-7C show examples of glyph alignment at different positions with respect to the path. As shown in FIG. 7A, a glyph 702 can be baseline aligned such that the base of the glyph 702 is aligned to the path 700. FIG. 7B shows an example where the glyph 702 is center aligned such that a center of the glyph is aligned to the path 700.

Figure 8:
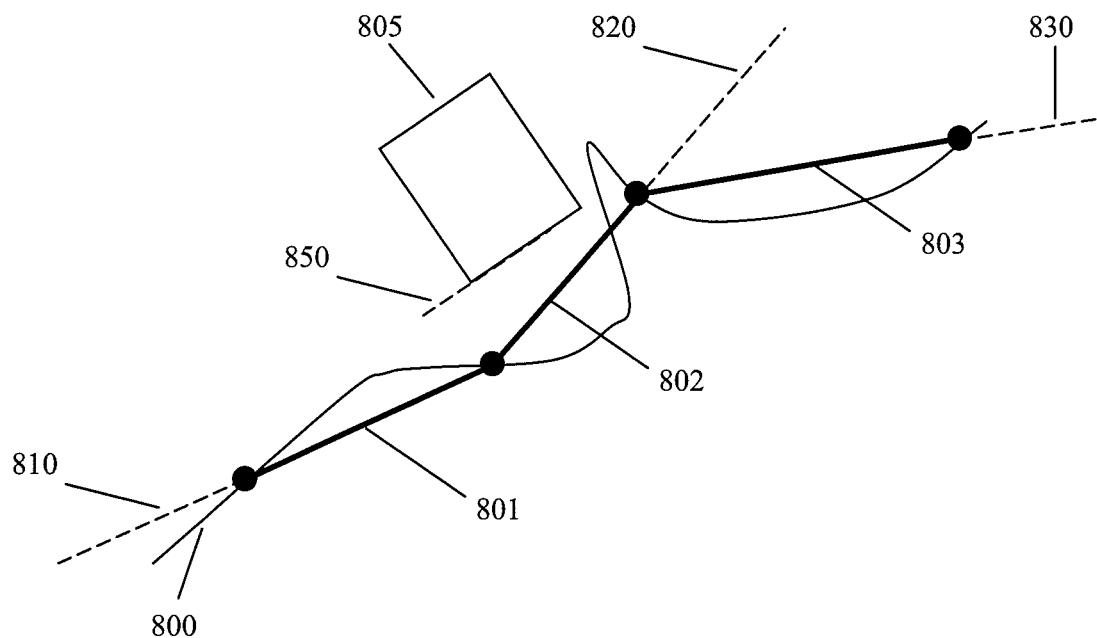
FIG. 8 is an example of a glyph rotated according to a smoothing tangent.

Associating a glyph with a path also can include rotating each glyph with respect to the path. When rotating a glyph so that it is parallel to the tangent of a path, the glyph can sometimes appear to be rotated at an awkward angle due to small and insignificant bumps on the path. Accordingly, the glyph may appear to be incorrectly rotated with respect to other glyphs in the text. To avoid rotation at awkward angles, the glyphs can be rotated according to a smoothed tangent. A smoothed tangent is an average tangent calculated based on cached tangent values of segments over a specified distance along the path. For example, as shown in FIG. 8, a glyph 805 located on segment 802 of path 800 is rotated according to a smoothed tangent 850. The smoothed tangent 850 is an average of the tangents 810, 820, and 830 of the respective segments 801, 802 and 803. In some implementations, the smoothed tangent can be a weighted average of the tangent values, in which the weighting depends on, for example, distance from the current segment. The number of tangents used to calculate the smoothed tangent can be determined by specifying a value called a smoothing radius. The smoothing radius sets the path length over which the cached tangents are averaged. The smoothing radius can be specified by a user or automatically set by the graphic editing program 110. In some implementations, the smoothing radius is calculated based on a font size associated with the glyphs. For example, the smoothing radius can be set to be half of the font size, twice the font size or equal to the font size. Other smoothing radius values can be used as well.

Figures 9A, 9B, 9C:
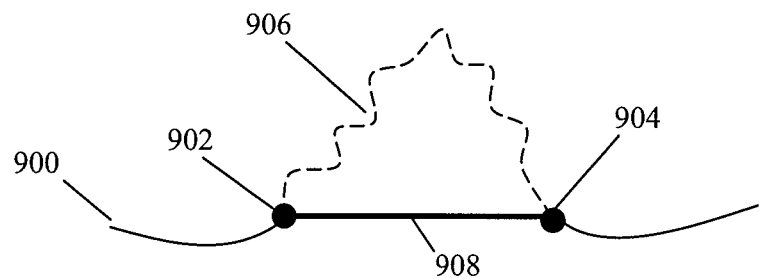
FIGS. 9A and 9B are examples of a path.
FIG. 9C is an example of text on a path.

When positioning text on a path that has a lot of variation in curvature, i.e., a path that is very "wiggly," the glyphs can appear to be closer together. This can be a result of measuring distance along the path. That is, the sample segments calculated by the graphic editing program 110 or the glyph widths are larger than the bumps on the path. FIG. 9A shows an example of displaying text on path having a lot of curvature variation using the mapping transformation discussed above. With no rotation applied to the glyphs in FIG. 9A, the text appears to be positioned very close together.

The spacing between glyphs on paths can be increased by applying a curvature variation factor to the advance values of the mapping. A curvature variation factor is calculated for each segment, and is used to scale the advance value that corresponds to this segment. To calculate a curvature variation factor for a particular segment, the graphic editing program 110 identifies two points along the path on either side of a specified location that are separated by a segment having a distance roughly equal to the font size. FIG. 9B shows an example a path 900 for which the curvature variation factor is calculated. If the glyph font size is equal to S and the location of interest is identified at position P on the path, then the two points 902, 904 are defined at distances roughly equal to P−S/2 and P+S/2. Accordingly, the region (dashed line region 906) between the two points 902, 904 may correspond to a path length that includes multiple path segments. The curvature variation factor then can be calculated as a ratio of the distance between the points 902, 904 along the path (region 906) to the distance between the points 902, 904 along a straight line 908 that connects the paths. The advance value of a path segment within the region 906 then can be scaled by the curvature variation factor. As a result, when the mapping is applied to the glyphs to translate their position from the composed line to the path, the spacing between glyphs is increased. FIG. 9C shows an example of text on the same path as shown in FIG. 9A. In the example of FIG. 9C, however, a curvature variation factor is used to scale advance values such that the text appears to be spaced further apart.

Alternatively, or in addition, the path can be smoothed to reduce the effect of small bumps. For example, the graphic editing program 110 can apply a polynomial interpolation function to obtain a new path in which small bumps have been removed. The new path then can be used to calculate the mapping of advance values and smoothing tangents.

The graphic editing program 110 can include additional settings that allow a user greater control over how text on path is displayed. In some cases, glyphs of different font sizes will be displayed on a path such that the foregoing calculations for concave adjustment factor, convex adjustment factor, smoothing tangent and curvature variation factor do not provide appropriate spacing between the glyphs on the path. In such cases, a user can modify settings in the graphic editing program 110 so that spacing between glyphs is user-defined.

In some applications, the graphics and illustrations developed by the graphic editing program 110 can be stored in an electronic document. An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method using a computing system having a processor and memory, the computer-implemented method comprising:
   creating, via the processor, a mapping between distances along a path and points on a line based on changes in direction of the path, wherein creating the mapping includes
   segmenting the path, based on a font size associated with glyphs, wherein the path is represented as interconnected segments, each having a length corresponding to the font size, after the segmenting,
   calculating an advance value for each of the segments representing the path based on a change in angle of the path with respect to a current segment, and
   calculating points on the line and a total line length based on the advance values;
   composing the glyphs on the line, having the total line length defined in accordance with the mapping, to form a composed line;
   associating the glyphs with the path in accordance with the mapping and the composed line; and
   outputting the association of the glyphs with the path for display of the glyphs along the path.

2. The method of claim 1, wherein composing glyphs on the line comprises passing the total line length and the glyphs to a separate line composer.

3. The method of claim 1, wherein associating the glyphs with the path comprises:
   translating each glyph, from a position on the line, to a position on the path in accordance with the mapping;
   aligning each glyph to the path; and
   rotating each glyph based on an average of slope values that each indicate a measure of slope of the path at a corresponding location on the path, wherein the locations on the path are selected in accordance with a specified smoothing radius.

4. The method of claim 3, wherein the specified smoothing radius is calculated in accordance with the font size associated with the glyphs.

5. The method of claim 1, wherein creating the mapping further comprises:
   calculating a curvature variation factor with respect to the current segment of the segmented path; and
   scaling the advance value associated with the current segment based on the curvature variation factor.

6. The method of claim 5, wherein calculating the curvature variation factor comprises:
   calculating a first spanning distance between two points on the path, wherein the two points fall before and after the current segment, respectively, and the first spanning distance corresponds to a straight line between the two points;
   calculating a second spanning distance between the two points on the path, wherein the second spanning distance corresponds to the path between the two points; and
   calculating the curvature variation factor as a ratio of the first spanning distance to the second spanning distance.

7. The method of claim 6, wherein a plurality of path segments are located between the two points on the path.

8. A computer program product, encoded on a non-transitory computer-readable medium, operable to cause data processing apparatus to perform operations comprising:
   creating a mapping between distances along a path and points on a line based on changes in direction of the path, wherein creating the mapping includes
   segmenting the path, based on a font size associated with glyphs, wherein the path is represented as interconnected segments, each having a length corresponding to the font size, after the segmenting,
   calculating an advance value for each of the segments representing the path based on a change in angle of the path with respect to a current segment, and
   calculating points on the line and a total line length based on the advance values;
   composing the glyphs on the line, having the total line length defined in accordance with the mapping, to form a composed line;
   associating the glyphs with the path in accordance with the mapping and the composed line; and
   outputting the association of the glyphs with the path for display of the glyphs along the path.

9. The computer program product of claim 8, wherein composing the glyphs on the line comprises passing the total line length and the glyphs to a separate line composer.

10. The computer program product of claim 8, wherein associating the glyphs with the path comprises:
    translating each glyph, from a position on the line, to a position on the path in accordance with the mapping;
    aligning each glyph to the path; and
    rotating each glyph based on an average of slope values that each indicate a measure of slope of the path at a corresponding location on the path, wherein the locations on the path are selected in accordance with a specified smoothing radius.

11. The computer program product of claim 10, wherein the specified smoothing radius is calculated in accordance with the font size associated with the glyphs.

12. The computer program product of claim 8, wherein creating the mapping further comprises:
    calculating a curvature variation factor with respect to the current segment of the segmented path; and
    scaling the advance value associated with the current segment based on the curvature variation factor.

13. The computer program product of claim 12, wherein calculating the curvature variation factor comprises:
    calculating a first spanning distance between two points on the path, wherein the two points fall before and after the current segment, respectively, and the first spanning distance corresponds to a straight line between the two points;
    calculating a second spanning distance between the two points on the path, wherein the second spanning distance corresponds to the path between the two points; and
    calculating the curvature variation factor as a ratio of the first spanning distance to the second spanning distance.

14. The computer program product of claim 13, wherein a plurality of path segments are located between the two points on the path.

15. A system comprising:
a user interface device; and
a processor operable to interact with the user interface device and to perform operations comprising:
creating a mapping between distances along a path and points on a line based on changes in direction of the path, wherein creating the mapping includes
segmenting the path, based on a font size associated with glyphs, wherein the path is represented as interconnected segments, each having a length corresponding to the font size, after the segmenting,
calculating an advance value for each of the segments representing the path based on a change in angle of the path with respect to a current segment, and
calculating points on the line and a total line length based on the advance values;
composing the glyphs on the line, having the total line length defined in accordance with the mapping, to form a composed line;
associating the glyphs with the path in accordance with the mapping and the composed line; and
outputting, to the user interface device, the association of the glyphs with the path for display of the glyphs along the path.

16. The system of claim 15, wherein composing the glyphs on the line comprises passing the total line length and the glyphs to a separate line composer.

17. The system of claim 15, wherein associating the glyphs with the path comprises:
translating each glyph, from a position on the line, to a position on the path in accordance with the mapping;
aligning each glyph to the path; and
rotating each glyph based on an average of slope values that each indicate a measure of slope of the path at a corresponding location on the path, wherein the locations on the path are selected in accordance with a specified smoothing radius.

18. The system of claim 17, wherein the specified smoothing radius is calculated in accordance with the font size associated with the glyphs.

19. The system of claim 15, wherein creating the mapping further comprises:
calculating a curvature variation factor with respect to the current segment of the segmented path; and
scaling the advance value associated with the current segment based on the curvature variation factor.

20. The system of claim 19, wherein calculating the curvature variation factor comprises:
calculating a first spanning distance between two points on the path, wherein the two points fall before and after the current segment, respectively, and the first spanning distance corresponds to a straight line between the two points;
calculating a second spanning distance between the two points on the path, wherein the second spanning distance corresponds to the path between the two points; and
calculating the curvature variation factor as a ratio of the first spanning distance to the second spanning distance.

21. The system of claim 20, wherein a plurality of path segments are located between the two points on the path.

* * * * *